United States Patent
Klein

(10) Patent No.: US 9,671,312 B2
(45) Date of Patent: Jun. 6, 2017

(54) METHOD FOR DETERMINING THE DIAMETER OF A ROTOR, WHICH IS EQUIPPED WITH ROTOR BLADES, OF A TURBOMACHINE

(75) Inventor: Karsten Klein, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 854 days.

(21) Appl. No.: 14/000,629

(22) PCT Filed: Dec. 30, 2011

(86) PCT No.: PCT/EP2011/074285
§ 371 (c)(1),
(2), (4) Date: Aug. 21, 2013

(87) PCT Pub. No.: WO2012/113487
PCT Pub. Date: Aug. 30, 2012

(65) Prior Publication Data
US 2013/0330173 A1   Dec. 12, 2013

(30) Foreign Application Priority Data
Feb. 22, 2011  (EP) ..................... 11155389

(51) Int. Cl.
*F01D 21/00* (2006.01)
*F01D 21/04* (2006.01)
(Continued)

(52) U.S. Cl.
CPC ............. *G01M 15/14* (2013.01); *B24B 19/14* (2013.01); *B24B 49/04* (2013.01); *F01D 5/027* (2013.01);
(Continued)

(58) Field of Classification Search
CPC ........ F01D 21/003; F01D 21/04; F01D 5/027; Y10T 29/4932; F05D 2230/64;
(Continued)

(56) References Cited

U.S. PATENT DOCUMENTS 3,908,444 A * 9/1975 Peter ...................... G01B 11/14
                                                       250/224
4,049,349 A   9/1977 Wennerstrom
(Continued)

FOREIGN PATENT DOCUMENTS

EP    2019185 A2   1/2009
GB    2069689 A    8/1981
(Continued)

*Primary Examiner* — Mark A Laurenzi
*Assistant Examiner* — Wesley Harris

(57) ABSTRACT

A method is provided for determining the diameter of a rotor of a turbomachine, rotor being equipped with rotor blades. The method involves setting the rotor with the rotor blade ring in rotation, arranging a clearance measuring device assigned to the rotor blade ring outside the region of the latter, measuring the distance to the rotor blades of the rotor blade ring which are rotating past the clearance measuring device, and using the measured distance for determining the diameter of the rotor. During measuring, the rotational speed is identical to, almost identical to or higher than the setpoint rotational speed of the rotor.

6 Claims, 2 Drawing Sheets

(51) Int. Cl.
- B24B 19/14 (2006.01)
- B24B 49/04 (2006.01)
- G01B 11/02 (2006.01)
- G01B 11/08 (2006.01)
- G01B 11/14 (2006.01)
- G01S 17/88 (2006.01)
- F01D 11/14 (2006.01)
- G01B 11/27 (2006.01)
- G01B 21/22 (2006.01)
- G01B 21/24 (2006.01)
- G01B 21/26 (2006.01)
- G01B 7/30 (2006.01)
- G01B 7/305 (2006.01)
- G01B 7/31 (2006.01)
- G01B 7/312 (2006.01)
- G01B 7/315 (2006.01)
- G01M 15/14 (2006.01)
- F01D 5/02 (2006.01)
- G01B 11/12 (2006.01)
- F01D 25/00 (2006.01)

(52) U.S. Cl.
CPC ............ *F01D 11/14* (2013.01); *F01D 21/003* (2013.01); *F01D 21/04* (2013.01); *F01D 25/00* (2013.01); *G01B 7/30* (2013.01); *G01B 7/305* (2013.01); *G01B 7/31* (2013.01); *G01B 7/312* (2013.01); *G01B 7/315* (2013.01); *G01B 11/028* (2013.01); *G01B 11/08* (2013.01); *G01B 11/12* (2013.01); *G01B 11/14* (2013.01); *G01B 11/27* (2013.01); *G01B 11/272* (2013.01); *G01B 21/22* (2013.01); *G01B 21/24* (2013.01); *G01B 21/26* (2013.01); *G01S 17/88* (2013.01); *F05D 2230/64* (2013.01); *F05D 2260/34* (2013.01); *Y10T 29/4932* (2015.01)

(58) Field of Classification Search
CPC ....... B24B 19/14; B24B 49/04; G01B 11/028; G01B 11/08; G01B 11/14; G01S 17/88
See application file for complete search history.

(56) References Cited

U.S. PATENT DOCUMENTS

| | | | |
|---|---|---|---|
| 4,092,537 A * | 5/1978 | Stewart | G03B 39/005 378/51 |
| 4,566,225 A | 1/1986 | Dautremont | |
| 5,704,826 A * | 1/1998 | De Luis Vizcaino | B24B 19/14 451/242 |
| 6,898,547 B1 | 5/2005 | DeBlois | |
| 2005/0234576 A1 | 10/2005 | Lee | |
| 2009/0025461 A1 | 1/2009 | Bellemare | |
| 2010/0089166 A1* | 4/2010 | Zielinski | G01H 1/006 73/660 |

FOREIGN PATENT DOCUMENTS

| | | |
|---|---|---|
| JP | S56153206 U | 11/1981 |
| JP | 5050638 B2 | 7/1994 |
| JP | 6053919 U | 7/1994 |
| JP | 2008279690 A | 11/2008 |

* cited by examiner

METHOD FOR DETERMINING THE DIAMETER OF A ROTOR, WHICH IS EQUIPPED WITH ROTOR BLADES, OF A TURBOMACHINE

CROSS REFERENCE TO RELATED APPLICATIONS

This application is the U.S. National Stage of International Application No. PCT/EP2011/074285 filed Dec. 30, 2011 and claims benefit thereof, the entire content of which is hereby incorporated herein by reference. The International Application claims priority to the European application No. 11155389.7 EP filed Feb. 22, 2011, the entire contents of which is hereby incorporated herein by reference.

FIELD OF INVENTION

The invention relates to a method for determining the diameter of a rotor, which is equipped with rotor blades, of a turbomachine. It further relates to a measuring system for a rotor of a turbomachine.

BACKGROUND OF INVENTION

Turbomachines encompass generally continuously working fluid energy machines such as compressors, steam turbines and gas turbines. A gas turbine converts energy from a hot combustion gas into kinetic energy which drives, on one hand, a compressor connected upstream and, on the other hand, typically an electricity generator. A gas turbine can however also be used to power aircraft.

Gas turbines comprise, on one hand, stationary guide vanes which guide the flow of air and gas and, on the other hand, gas turbine rotor blades which rotate about the axis of the turbomachine and form rotor blade rings which are arranged one behind another in the axial direction. The rotor blades typically extend from the axis of the turbomachine to an internal wall arranged coaxially therewith, which thus defines the flow channel for the combustion gas. In this context, the clearance between the body of the rotor blade and the internal wall must be kept as small as possible in order to minimize the loss of efficiency due to combustion gas flowing past the rotor blades along the internal wall.

However, the clearance between the internal wall and rotor blade tips located opposite this can vary due to differential thermal expansion of the internal wall and the rotor blade, centrifugal forces and radial accelerations, and also assembly play of the components in question. In such cases, in order to avoid damage to the rotor blade body and/or to the internal wall, a certain minimum clearance must be planned when building the gas turbine. Damage of this nature could in particular result in reduced life of the rotor blades or of the internal wall.

Furthermore, various optical systems for measuring the radial gap during operation of turbomachines are known, for example from U.S. Pat. No. 4,049,349 A1 and GB 2 069 689 A1. What is more, it is known from U.S. Pat. No. 6,898,547 A1 to use sensors to determine the radii of two adjacent rotor components in order to achieve reliable assembly of the rotor components.

SUMMARY OF INVENTION

It is an object of the invention therefore to indicate a method which permits a comparatively long life of the rotor blade and, at the same time, a particularly high efficiency of the turbomachine.

This object is achieved according to the invention in that the diameter of the rotor with the rotor blades is determined, in that the rotor with the rotor blade ring is set in rotation, a clearance measuring device assigned to the rotor blade ring and arranged outside the region of the latter determines the distance to the rotor blades of the rotor blade ring which are rotating past the clearance measuring device at a rotational speed that is identical to, almost identical to or higher than the setpoint rotational speed of the rotor, and the determined distance is used for determining the diameter of the rotor.

In this context, the invention is based on the observation that a comparatively long life could be achieved, while at the same time optimizing the efficiency, by controlled reduction in the minimum clearance between the internal wall and the rotor blade tips. This minimum clearance is, here, particularly necessary because the rotor blades, when installed in the rotor when cold, have a certain amount of play which must be incorporated into the respective tolerance models. This play results in a variation in the diameter of the rotor with the integrated rotor blades on the respective rotor blade ring.

When the rotational speed is sufficiently high, centrifugal forces when rotating eliminate the play of the rotor blades in the respective holder on the rotor. For this reason, the diameter of the rotor with the rotor blades should be determined when in rotation as here, on account of the play which is not present, a substantially smaller tolerance is then to be planned with respect to the minimum clearance from the internal wall. To that end, a clearance measuring device assigned to the rotor blade ring is arranged outside the region of the latter, and the distance to the rotor blades of the rotor blade ring which are rotating past the clearance measuring device is measured. The absolute diameter of the rotor can then be determined by calculation, in conjunction with the prescribed and thus known clearance between the sensor and the axis of the rotor. In order to determine the radius of the rotor, the determined clearance must be subtracted from the known clearance.

The rotational speed at which the measurement is made is identical to or at least almost identical to—or even higher than—the setpoint rotational speed of the rotor. This has the advantage that, as in the case of intended use, in particular in the case of turbine and compressor blades and disks, centrifugal force-dependent changes in component lengths arise which must be taken into account when determining the absolute diameter of the rotor. Where the airfoils of such blades are twisted, the centrifugal forces can even cause the blade to straighten, which influences the diameter of the rotor and is also taken into account when determining and establishing the diameter of the internal wall. The rotor diameter thus determined can be used to prescribe the diameter of the internal wall more precisely than hitherto, such that the radial clearance dimensions between the blade tips and the internal wall can be made smaller than hitherto. In operation, the turbomachine designed in this way can thus achieve better efficiency than hitherto, and rubbing between the rotor blades and the internal wall, due to the radial gap chosen during construction being too small, can be reliably prevented.

In an advantageous configuration, a second clearance measuring device assigned to the rotor blade ring is arranged outside the region of the latter. While a single clearance measuring device is capable of measuring merely the clearance between the rotor blades and a fixed reference system, the relationship of the latter to the fixed axis of the rotor is not necessarily known. By virtue of the combination with a second clearance measuring device, and corresponding calibration of the two measuring devices, automated measurement of the absolute diameter of the rotor is made possible. For this purpose, the position of the second clearance measuring device relative to the first clearance measuring device is determined, and the distance to the rotor blades of the rotor blade ring which are rotating past the second clearance measuring device is measured.

The diameter of the rotor of the turbomachine typically varies in the axial direction. Since the turbine part of a gas turbine expands the gas, in this case the diameter increases toward the outlet. Therefore, a further diameter determination is to be carried out for each rotor blade ring which has a separate rotor blade length, in order to achieve an optimization of the minimum distance to the internal wall in this case, too. For this reason, a third clearance measuring device, assigned to a second rotor blade ring, is advantageously arranged outside the region of the latter, and the distance to the rotor blades of the second rotor blade ring which are rotating past the third clearance measuring device is measured. An additional arrangement of this type, consisting of one or more clearance measuring devices, allows the diameter in every axial region of the rotor to be determined simultaneously and reliably.

In an alternative or additional advantageous configuration of the method, the respective clearance measuring device is displaced in the axial direction of the rotor. By means of such a displaceably arranged clearance measuring device, measurement at various rotor blade rings in various axial regions of the rotor is made possible, without having to use multiple clearance measuring devices.

Advantageously, an optical clearance measuring device—in a particularly advantageous configuration a laser clearance measuring device—is used as the respective clearance measuring device. This permits particularly precise measurement of the clearances, whereby the minimum clearance between the internal wall and the rotor blades can be adapted with even more precision.

In a particularly advantageous configuration, the method is carried out in a balancing system and/or during balancing of the rotor. During balancing, imbalances in the rotor are dealt with before it is passed for final assembly in the turbine. For this, the rotor is set in rotation and corresponding imbalances are measured. This procedure, wherein the rotation eliminates the play of the rotor blades, can also be used for a second purpose, namely the described clearance measurement, thus achieving a particularly quick and economical process for determining the diameter of the rotor.

Advantageously, a minimum rotational speed is prescribed for the rotational movement while carrying out the measurement. This is chosen in order to generate centrifugal forces which reliably eliminate the play of the rotor blades, and rule out corresponding tolerances. In this case, the minimum rotational speed should be determined specifically based on the parameters of the rotor.

The diameter of the rotor, determined in this way, is advantageously used for construction of the interior housing of the turbomachine. In this context, the minimum clearance can be reduced by means of the now considerably reduced tolerance in the rotor diameter, resulting in increased efficiency.

A turbomachine is advantageously constructed using the method as set out and, in an advantageous configuration, is used in a power plant.

With respect to the measuring system for a rotor of a turbomachine, the invention is achieved in that the measuring system comprises a holding apparatus for the rotor with a number of rotor blades forming a rotor blade ring, a balancing housing surrounding the rotor, also a drive apparatus formed so as to set the rotor in rotation, and a clearance measuring device formed so as to measure the distance to the rotor blades of the rotor blade ring which are rotating past the clearance measuring device. The measuring system can then use the distance between the sensor and the axis of the rotor to determine the rotor diameter.

This measure makes it possible to simultaneously determine any imbalance in the rotor and the rotor diameter, without a further sequential working step being necessary for the latter. The production method thus saves time.

Moreover, the sensors can be arranged on the inner side of the balancing housing, which in terms of construction is much easier to configure than inside the turbomachine or on a separate framework. In this context, the distance between the sensor or, as the case may be, the sensor head and the rotor can also be substantially greater—for example some tens of centimeters—than in the case of prior art sensors which are always used in turbomachines for determining the radial gap. This simplifies setting up the measuring and avoids costly assembly of the sensor. Of further advantage, the sensor need only withstand the temperatures which arise during balancing and not the operating temperatures of the gas turbine. This increases the range of possible sensors and measurement methods significantly, and also allows inexpensive sensors to be used. Optical sensors are then preferably used.

The advantages obtained using the invention consist especially in the fact that measuring the rotor diameter during rotation makes it possible to determine the rotor diameter with more precision, such that the clearance with respect to the internal wall can be reduced during construction and the efficiency of the turbomachine can thus be increased. This is made possible first by means of the precise prediction of the rotor diameter and the tolerances and outlet dimensions associated therewith. Optimized control of the rotor diameter thus leads to the production process being optimized.

BRIEF DESCRIPTION OF THE DRAWINGS

An exemplary embodiment of the invention will be explained with reference to a drawing, in which.

DETAILED DESCRIPTION OF INVENTION

In all figures, identical parts are given the same reference signs.

Figure 1:
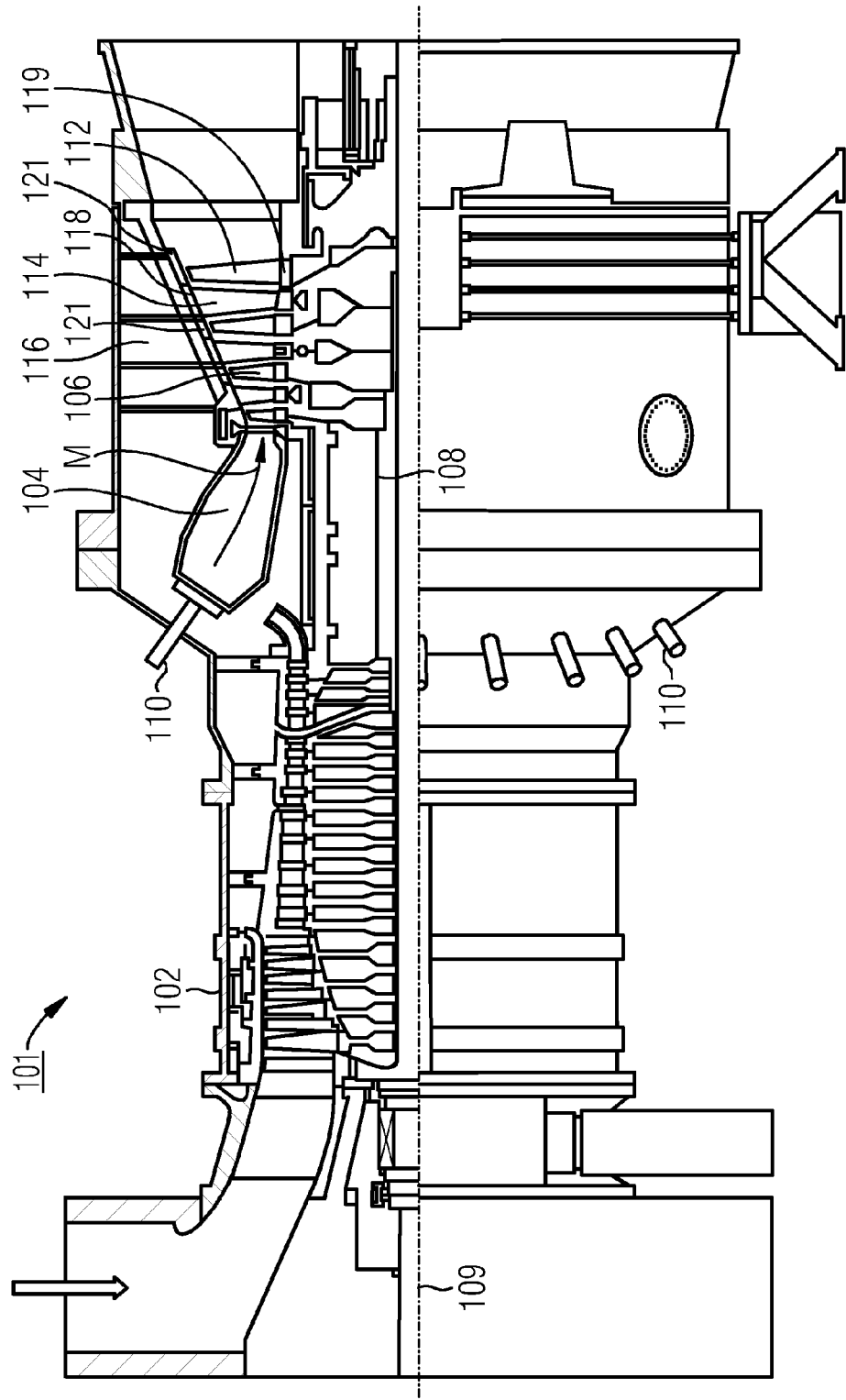
FIG. 1 shows a gas turbine.

A gas turbine 101 as shown in FIG. 1 has a compressor 102 for combustion air, a combustor 104 and a turbine unit 106 for driving the compressor 102 and a generator or a work machine (not shown). To that end, the turbine unit 106 and the compressor 102 are arranged on a common turbine shaft 108, also termed the turbine rotor, to which the generator or, as the case may be, the work machine is also connected, and which is mounted rotatably about its central axis 109. These units form the rotor of the gas turbine 101. The combustor 104, which is embodied as an annular combustor, is equipped with a number of burners 110 for burning a liquid or gaseous fuel.

The turbine unit 106 has a number of rotary rotor blades 112 which are connected to the turbine shaft 108. The rotor blades 112 are arranged in a ring on the turbine shaft 108 and thus form a number of rotor blade rings or rows. The turbine unit 106 further comprises a number of stationary guide vanes 114 which are fastened, also in a ring shape, to a guide vane carrier 116 of the turbine unit 106 so as to form guide vane rows. The rotor blades 112 serve in this context to drive the turbine shaft 108 by impulse transfer from the working medium M which flows through the turbine unit 106. The guide vanes 114 serve, on the other hand, to guide the flow of the working medium M between in each case two successive—as seen in the direction of flow of the working medium M—rotor blade rows or rotor blade rings. A successive pair, consisting of a ring of guide vanes 114 or a guide vane row and of a ring of rotor blades 112 or a rotor blade row, is in this context also termed a turbine stage.

Each guide vane 114 has a platform 118 which is arranged as a wall element for attaching the respective guide vane 114 to a guide vane carrier 116 of the turbine unit 106. The platform 118 is in this context a component which is subjected to comparatively high thermal stresses and which forms the outer limit of a hot gas channel for the working medium M which flows through the turbine unit 106. Each rotor blade 112 is, in analogous fashion, fastened to the turbine shaft 108 by means of a platform 119, also termed the blade root.

A ring segment 121 is in each case arranged on a guide vane carrier 116 of the turbine unit 106 between the spaced apart platforms 118 of the guide vanes 114 of two adjacent guide vane rows. The outer surface of each ring segment 121 is in this context also exposed to the hot working medium M flowing through the turbine unit 106, and is separated in the radial direction from the outer end of the rotor blades 112 located opposite by a gap. The ring segments 121 arranged between adjacent guide vane rows serve in this context in particular as covering elements which protect the interior housing in the guide vane carrier 116, or other integrated housing parts, from thermal overloading caused by the hot working medium M which is flowing through the turbine 106.

In the exemplary embodiment, the combustor 104 is configured as what is termed an annular combustor, wherein a multiplicity of burners 110, arranged around the turbine shaft 108 in the circumferential direction, open into a common combustor space. To that end, the combustor 104 is configured in its entirety as an annular structure which is positioned around the turbine shaft 108.

The illustrated gap between the rotor blades 112 on one side and the ring segments 121 and platforms 118 on the other, which together form the internal wall of the hot gas channel, should be kept particularly small in order to increase efficiency. This is made possible by precisely determining the rotor diameter.

The rotor diameter is measured during the balancing procedure. Here, the rotor with turbine shaft 108 and rotor blades 112 is arranged in a balancing housing 122, as shown schematically in FIG. 2. During the balancing procedure, the rotor is set in rotation and rotated at the setpoint rotational speed of the rotor. In the case of rotors of stationary turbines used for generating electricity, for example, this is 3000 $min^{-1}$ or 3600 $min^{-1}$, depending on the mains frequency. In the meantime, corresponding imbalances are identified and balanced out. The rotation is accordingly carried out at a prescribed minimum rotational speed and thus also eliminates the play of the rotor blades 112 in their attachment to the turbine shaft 108. In this state, the rotor diameter can thereby be measured with particular precision.

In particular on account of the high rotational speeds at which the diameter is determined, the diameter that the rotor will have during operation can be determined with considerably more precision than by simulation. The blades are then seated without play in their retaining slots while the airfoils thereof experience centrifugal force-dependent elongations, which are detected by the measuring system while the rotor diameter is being determined.

Figure 2:
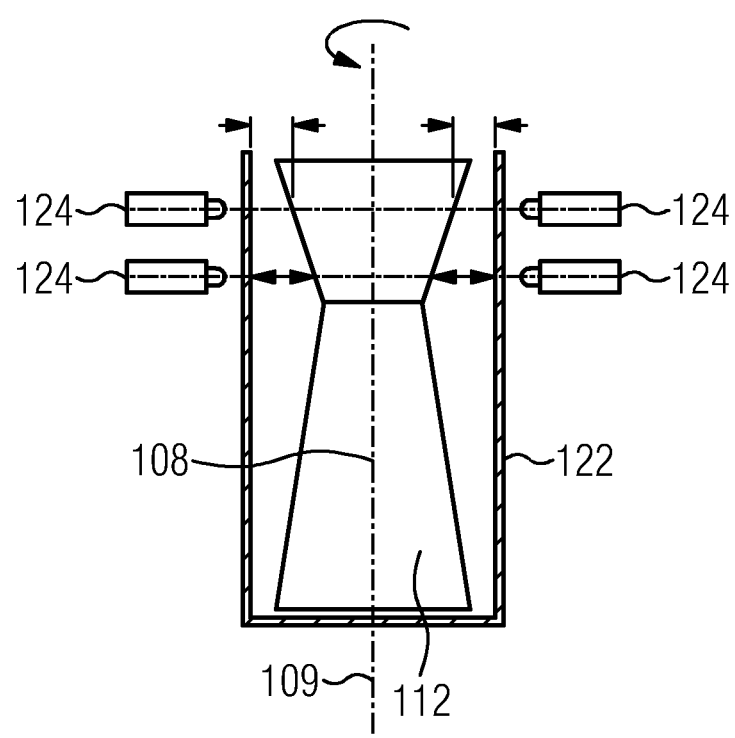
FIG. 2 shows an idealized section view of the rotor during the balancing process.

To that end, in FIG. 2 four clearance measuring devices 124, which are formed as laser clearance measuring devices, are in each case arranged in pairs opposite each other. The clearance measuring devices 124 can be moved in the axial direction along the central axis 109 and can thus be assigned in pairs to in each case any one rotor blade ring. The separation between the clearance measuring devices 124 which are in each case arranged in pairs was determined precisely beforehand, such that the rotor diameter at each rotor blade ring can be determined with precision by measuring the distance to the rotor blades 112 on both sides.

In summary, the invention relates to a method for determining the diameter of a rotor, which is equipped with rotor blades 114, of a turbomachine. In order to permit a comparatively long life of the rotor blade and, at the same time, a particularly high efficiency of the turbomachine, it is proposed to set the rotor with the rotor blade ring in rotation and to arrange a clearance measuring device 124 assigned to the rotor blade ring outside the region of the latter, in order subsequently to measure the distance to the rotor blades 114 of the rotor blade ring which are rotating past the clearance measuring device 124. This distance can then be used, in conjunction with the distance between the sensor and the axis of the rotor, to determine the rotor diameter. The rotor diameter can then be taken into account in the construction and assembly of the turbomachine.

This knowledge makes it possible to minimize the gap between the internal wall and the rotor blades 112 during construction of the gas turbine 101 and in so doing to increase the efficiency.

The invention claimed is:

1. A method for determining the diameter of a rotor of a turbomachine, which rotor is equipped with rotor blades, comprising:
   setting the rotor with a number of rotor blades forming a rotor blade ring in rotation,
   arranging a first clearance measuring device, which is assigned to the rotor blade ring, outside a region of the rotor blade ring,
   measuring a distance from the first clearance measuring device to the rotor blades of the rotor blade ring which are rotating past the first clearance measuring device, and
   using the measured distance for determining the diameter of the rotor,
   displacing the first clearance measuring device in the axial direction of the rotor along a central axis,
   arranging a third clearance measuring device, which is assigned to a second rotor blade ring, outside the region of the rotor blade ring, and
   measuring the distance from the third clearance measuring device to the rotor blades of the second rotor blade ring which are rotating past the third clearance measuring device,
   wherein, during measuring, the rotational speed is identical to, almost identical to or higher than a setpoint rotational speed of the rotor for operation.

2. The method as claimed in claim 1, further comprising:
   arranging a second clearance measuring device, which is assigned to the rotor blade ring, outside the region of the rotor blade ring, determining the position of the second clearance measuring device relative to the first clearance measuring device, and measuring the distance from the second clearance measuring device to the rotor blades of the rotor blade ring which are rotating past the second clearance measuring device.

3. The method as claimed in claim 1, wherein an optical clearance measuring device is used as the first clearance measuring device.

4. The method as claimed in claim 3, wherein a laser clearance measuring device is used as the optical clearance measuring device.

5. The method as claimed in claim 1, wherein the method is carried out in a balancing system and/or during balancing of the rotor.

6. The method as claimed in claim 1, further comprising identifying a minimum clearance between the rotor of the turbomachine and an interior housing of the turbomachine, wherein the diameter of the rotor is taken into account during construction and/or assembly of the interior housing of the turbomachine.

\* \* \* \* \*